(12) United States Patent
Athanasakopoulos et al.

(10) Patent No.: US 11,975,595 B2
(45) Date of Patent: May 7, 2024

(54) CLUTCH BURNISHING

(71) Applicant: THERMO KING LLC, Minneapolis, MN (US)

(72) Inventors: Alexandros Athanasakopoulos, Bloomington, MN (US); Scott A. Waters, Lakeville, MN (US); Vincent McCannell-Unger, Minneapolis, MN (US); Timothy J. Neu, Cottage Grove, MN (US); Lucas Koch, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 2 days.

(21) Appl. No.: 17/589,406

(22) Filed: Jan. 31, 2022

(65) Prior Publication Data

US 2023/0241945 A1 Aug. 3, 2023

(51) Int. Cl.
*B60H 1/32* (2006.01)
*F16D 48/06* (2006.01)

(52) U.S. Cl.
CPC ......... *B60H 1/3222* (2013.01); *B60H 1/3205* (2013.01); *B60H 1/3232* (2013.01); *F16D 48/06* (2013.01); *F16D 2500/1022* (2013.01); *F16D 2500/50242* (2013.01)

(58) Field of Classification Search
CPC .. B60H 1/3222; B60H 1/3205; B60H 1/3232; F16D 2500/1022; F16D 2500/50242; F16D 48/06
See application file for complete search history.

(56) References Cited

U.S. PATENT DOCUMENTS

| | | | |
|---|---|---|---|
| 4,484,619 A * | 11/1984 | Franz | B60H 1/3205 165/254 |
| 5,628,390 A | 5/1997 | Richardson et al. | |
| 6,625,997 B1 * | 9/2003 | Schultz | B60H 1/00792 62/227 |
| 2004/0019409 A1 * | 1/2004 | Kelly | B60H 1/3216 700/282 |
| 2006/0272343 A1 * | 12/2006 | Takahashi | B60H 1/3208 62/230 |

(Continued)

FOREIGN PATENT DOCUMENTS

| | | |
|---|---|---|
| JP | H09272322 A * | 10/1997 |
| JP | 2005-003131 | 1/2005 |

(Continued)

OTHER PUBLICATIONS

Extended European Search Report, issued in the corresponding European Patent Application No. 23154167.3, dated Apr. 17, 2023, 8 pages.

*Primary Examiner* — Nelson J Nieves
(74) *Attorney, Agent, or Firm* — HSML P.C.

(57) ABSTRACT

Technologies for enhancing performance of a clutch that is installed in connection with a transport climate control system is provided. Enhancing performance of the clutch can be performed by establishing engagement cycling parameters for the clutch, cycling the clutch through a repetition of engagement and disengagement in accordance with the established engagement cycling parameters, and terminating the cycling upon achievement of at least one predetermined criterion.

19 Claims, 5 Drawing Sheets

(56) References Cited

U.S. PATENT DOCUMENTS

| | | | |
|---|---|---|---|
| 2006/0275145 A1* | 12/2006 | Takahashi | F04B 27/1804 417/374 |
| 2010/0242510 A1* | 9/2010 | Kadle | B60H 1/3208 700/275 |
| 2012/0109469 A1* | 5/2012 | Pebley | B60L 1/02 701/48 |
| 2013/0074529 A1* | 3/2013 | Rollinger | B60H 1/3208 62/115 |
| 2013/0074537 A1* | 3/2013 | Rollinger | F25B 49/022 62/115 |
| 2017/0015176 A1* | 1/2017 | Ulrey | B60H 1/3222 |
| 2017/0292419 A1* | 10/2017 | Conway | F04C 2/10 |
| 2018/0162377 A1* | 6/2018 | Colavincenzo | B60K 6/26 |
| 2020/0231041 A1 | 7/2020 | Lavrich et al. | |

FOREIGN PATENT DOCUMENTS

| | | | |
|---|---|---|---|
| KR | 20020058751 A | * | 7/2002 |
| WO | 2014085672 | | 6/2014 |

\* cited by examiner

CLUTCH BURNISHING

FIELD

The solutions described and recited herein pertain generally to burnishing an electromagnetic clutch prior to utilization by a transport climate control system.

BACKGROUND

A transport climate control system may include, e.g., a transport refrigeration system (TRS) and/or a heating, ventilation and air conditioning (HVAC) system. In some embodiments, the power train for the transport climate control system can utilize a clutch to engage with a prime mover configured to provide power to the transport climate control system. It will be appreciated that an electromagnetic clutch that is not burnished in a controlled manner can have a reduced holding force that may not meet required torque-carrying capability. Clutch performance could be impacted by slippage or problems with the clutch in the short term and/or reduce holding force and life of clutch in the long term if not broken-in properly.

SUMMARY

The solutions described and recited herein pertain generally to burnishing an electromagnetic clutch prior to utilization by a transport climate control system.

In accordance with at least one non-limiting example embodiment described and recited herein, a method for enhancing performance of a clutch that is newly installed in connection with a transport climate control system includes establishing engagement cycling parameters for the clutch, cycling the clutch through a repetition of engagement and disengagement in accordance with the established engagement cycling parameters, and terminating the cycling upon achievement of at least one predetermined criterion.

In accordance with at least on other non-limiting example embodiment described and recited herein, a computer-readable medium has executable instructions that, when executed, cause one or more processors to pre-burnish an electromagnetic clutch, prior to application. The instructions may include detecting input of at least one predetermined condition, initiating cycling of the clutch based on the detection, cycling the clutch through a repetition of engagement and disengagement in accordance with predetermined cycling parameters, and terminating the cycling upon reaching at least one predetermined milestone.

In accordance with yet another non-limiting example embodiment described and recited herein, a transport climate control system includes a clutch, a compressor, and a controller to control burnishing of the clutch, upon installation onto the compressor, by establishing engagement cycling parameters for the clutch, cycling the clutch through a repetition of engagement and disengagement in accordance with the established engagement cycling parameters, and terminating the cycling upon achievement of at least one predetermined criterion.

DRAWINGS

Reference may be made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

DETAILED DESCRIPTION

Figure 1:
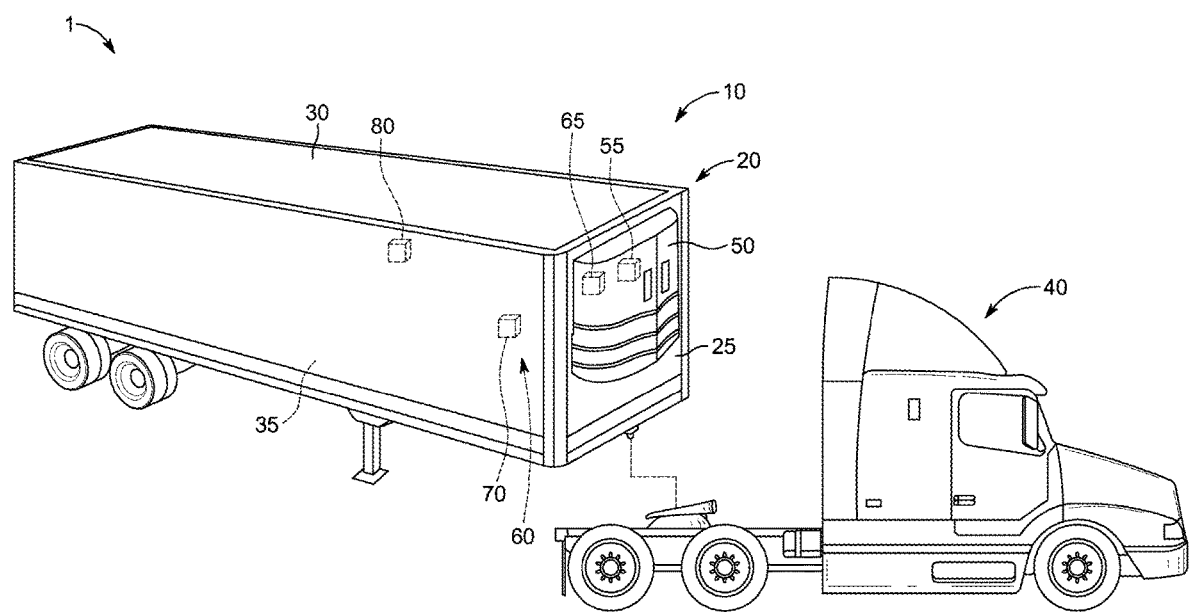
FIG. 1 shows a perspective view of a refrigerated transport unit, in accordance with one or more non-limiting example embodiments of clutch burnishing.

Embodiments described and/or recited herein may refer to the accompanying drawings; however, such embodiments are non-limiting examples that may be embodied in various other forms, as well. Well-known functions or constructions are not described in detail to avoid obscuring the present disclosure unnecessarily. Therefore, specific structural and functional details disclosed herein are not to be interpreted as limiting, but merely as a basis for the claims and as a representative basis for teaching one skilled in the art how to variously utilize the present disclosure in any appropriately detailed structure. In this description, as well as in the drawings, similarly-referenced numbers represent elements that may perform the same, similar, or equivalent functions.

The scope of the disclosure should be determined by the appended claims and their legal equivalents, rather than by the examples given herein. For example, the operations or functions recited in any method claims may be executed in any order and not be limited to the sequence presented in the claims. Moreover, no element is essential to the practice of the disclosure unless specifically described herein as "critical" or "essential."

The solutions described and recited herein pertain generally to burnishing an electromagnetic clutch prior to utilization by a transport climate control system.

In particular, the technologies described and recited herein pertain to burnishing an electromagnetic clutch in a controlled manner so that the clutch is able to meet predetermined torque-carrying requirements in its first application. That is, the technologies described and recited herein result in the elimination of slippage and other performance-hindering issues associated with clutches that are not fully burnished, yet still put in use. Further still, the lifespan of burnished clutches, in accordance with the present embodiments, may be extended, and torque carrying capabilities thereof may be increased.

FIG. 1 shows a perspective view of a refrigerated transport unit, in accordance with one or more non-limiting example embodiments of clutch burnishing. Refrigerated transport unit 1 includes, at least, transport refrigeration system (TRS) 10 and transport unit 20. Dashed lines are used in FIG. 1 to illustrate features that would not be visible in the view shown.

Transport unit 20 may be attached to tractor 40, which may be configured to tow-transport unit 20. As shown in FIG. 1, the transport unit 20 is a trailer. It will be appreciated that the embodiments described herein are not limited to a trailer, but may apply to any type of non-passenger transport unit (e.g., a truck, a container (such as a container on a flat car, an intermodal container, a marine container, etc.), a box car, a semi-tractor, other similar transport unit, or even passenger vehicles, e.g., mass transit buses, etc.

TRS 10 includes transport refrigeration unit (TRU) 50 that is disposed on a front wall 25 of transport unit 20. In some embodiments, TRU 50 may be disposed on a roof 30 or other wall of transport unit 20. TRU 50 is configured to provide conditioned air into an internal space 35 of transport unit 20 to provide a desired climate for the cargo being held within the internal space 35 of transport unit 20.

TRU 50 may include compressor 55, and in an accordance with at least one non-limiting embodiment, compressor 55 may be used in a working fluid circuit (not shown) to compress a working fluid (e.g., refrigerant) to heat or cool air. In other embodiments, compressor 55 may be used for air quality control.

TRS 10 further includes programmable TRS controller 60, which may be configured as an integrated control unit 65 or a control unit formed by a distributed network of TRS elements 65, 70.

The TRS 10 also includes one or more sensors 80, which may be configured to detect one or more environmental conditions, e.g., temperature, humidity, air quality, etc., of TRS 10, including but not limited to the internal space 35 of transport unit 20 and the ambient air outside of the transport unit 20. TRS 10 utilizes data received from one or more of sensors 80 pertaining to respective detected environmental conditions to control TRU 50 so that the internal space 35 has the desired environmental condition(s). Sensors 80 may further be configured to regulate clutch burnishing, as described and recited herein.

Figure 2:
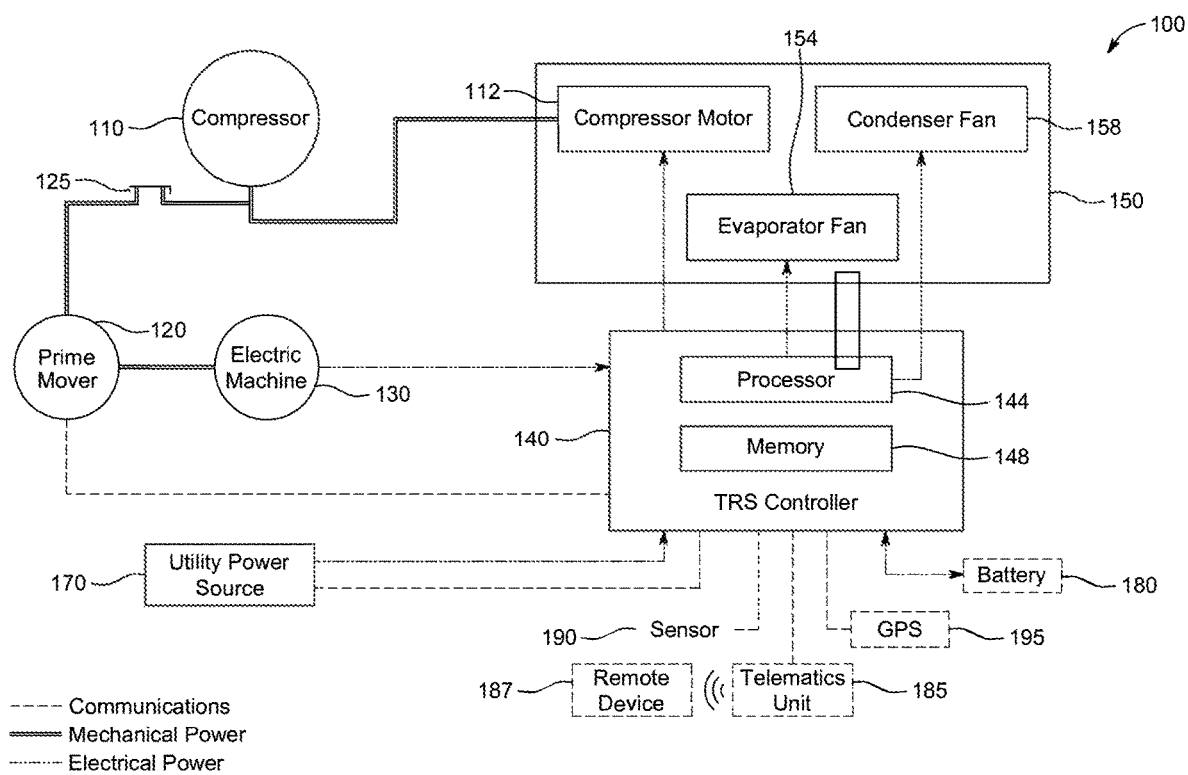
FIG. 2 shows a block schematic diagram for a power management system for a transport climate control system, in accordance with one or more non-limiting example embodiments of clutch burnishing.

FIG. 2 shows a block schematic diagram for a power management system for TRS 10, in accordance with one or more non-limiting example embodiments of clutch burnishing.

Power management system 100 may be configured to provide power to TRS 10. More particularly, power management system 100 may be configured to provide power to TRU 50 (including, for example, the compressor 110, one or more fans/blowers, the TRS controller 60, a telematics unit, the one or more sensors 80, one or more valves, etc.) and its corresponding components.

Compressor 110, included in TRU 50, may pertain to a working fluid circuit (not shown) or other air quality control system. For example, when in a working fluid circuit, compressor 110 may compress a working fluid, which may traverse the working fluid circuit (e.g., through a condenser, an evaporator, and an expansion valve, etc.) to exchange heat with air, i.e., condition air, which may be injected into an internal space of the transport unit to climate condition the internal space.

Power management system 100 includes an electrical machine 130, which is mechanically connected to prime mover 120, and may be connected to utility power source 170 via a TRS controller 60.

Prime mover 120 may be, e.g., an engine such as a diesel engine, a compressed natural gas engine, etc., disposed in TRU 50. In another non-limiting example embodiment, prime mover 120 may be a prime mover for a vehicle (e.g., the tractor 40) that is configured to power and move the vehicle, or part of a generator set that can be attached, for example, to the transport unit.

Electric machine 130 is configured to receive mechanical power from prime mover 120 and to produce electrical power. For example, electric machine 130 may be and/or include an induction machine, e.g., an asynchronous induction machine, a motor, etc. In operation, prime mover 120 and electric machine 130 may provide electric power to TRS controller 60, which can then be relayed, for example, to the electrical power load 150.

In the non-limiting example embodiment of FIG. 2, prime mover 120 may also be configured to provide mechanical power to compressor 110. Compressor 110 is also mechanically connected to a compressor motor 112.

Compressor motor 112 is an electrical motor configured to be an alternative source of mechanical power for compressor 110, and may provide mechanical power to compressor 110 when, for example, the prime mover 120 is not operating or is otherwise unable to generate and provide power to compressor 110. Thus, compressor 110 may be configured to be mechanically driven by either prime mover 120 or compressor motor 112.

Compressor motor 112 may be disposed separate from the compressor 110, as in FIG. 2. However, it should be appreciated that the compressor motor 112 may be incorporated into the compressor 110 in at least one alternate embodiment, e.g., as part of a hermetically sealed compressor.

Clutch 125 is an electromagnetic clutch provided in the mechanical connection between prime mover 120 and compressor 110. Clutch 125 may be configured to engage and disengage the mechanical connection of prime mover 120. Accordingly, compressor motor 112, prime mover 120, and compressor 110 may be provided in a single power train. Clutch 125 may disengage prime mover 120 when, for example, compressor motor 112 is providing mechanical power to compressor 110 instead of prime mover 120. While FIG. 2 only illustrates a single clutch 125, it will be appreciated that other embodiments of a power management system may include additional clutches.

TRS 10 may include various components, e.g., fans, blowers, valves, sensors, etc., that require electrical power to operate. Electrical power load 150 is electrical power required by such electrically powered components. Electrical power load 150 may include, for example, compressor motor 112, evaporator fan 154, and condenser fan 158 among other potential electrical components of the TRS 10. Electrical power load 150 may be based on the configuration of the TRS 10 and TRU 50 and may include additional electrically powered components.

TRS controller 60 may control operation of TRU 50, TRS 10, and the power management system, including, clutch 125. TRS controller 60 includes a processor 148 and memory 144 for storing information. TRS controller 60 is configured to control TRS 10 to provide climate control within the internal space 35 so that internal space 35 reaches and maintains one or more desired environmental conditions.

Utility power source 170 may provide power to a stationary TRS 10. That is, TRS 10 may include a plug-in that allows TRS 10 to be electrically connected to the utility power source 170 at, e.g., a pick-up or drop-off facility for goods transported by the transport unit, at an intermediate stopping location, e.g., overnight stopping location, etc. Utility power source 170 may be a power source external to the refrigerated transport unit and does not travel with the refrigerated transport unit. In at least one example embodiment, utility power source 170 may be a utility power grid. In other embodiments, the utility power source 170 can be different types of power sources at the facility such as, but not limited to, a power generator at the facility, solar panel(s) at the facility, and/or wind turbine(s) at the facility, etc. The utility power source 170 may provide electric power to TRS controller 60, which can then be relayed, for example, to the electrical power load 150.

Battery 180 may be provided as a secondary power source. For example, battery 180 may provide power when TRU 50 utilizes utility power source 170, but utility power source 170 is limited or unable to otherwise provide sufficient power as required by the electrical power load 150. Battery 180 may be disposed in or on the transport unit, in TRU 50, or in the tractor configured to tow the transport unit. According to at least one other non-limiting example, battery 180 may be the vehicle battery and/or alternator source for a bus. Regardless, battery 180 may provide power for evaporator fan 14 and condenser fan 158. In some embodiments, the battery 180 can be a 24-volt DC battery.

Telematics unit 185, disposed in TRU 50, may be configured to wirelessly communicate with a remote electronic device 187. Remote electronic device 187 may be, for example, a computer, a server, a server network, etc. For example, telematics unit 185 may wirelessly communicate with a remote electronic device of a facility that directs operation of multiple TRSs, multiple transport units, or its drivers or a remote electronic device at the facility at which the refrigerated transport units are parked. In at least one embodiment, telematics unit 185 may be incorporated into the TRS controller 60.

GPS 195, utilized to provide a current location of the transport unit to controller 60, may be incorporated into controller 60 or telematics unit 185.

Figure 3:
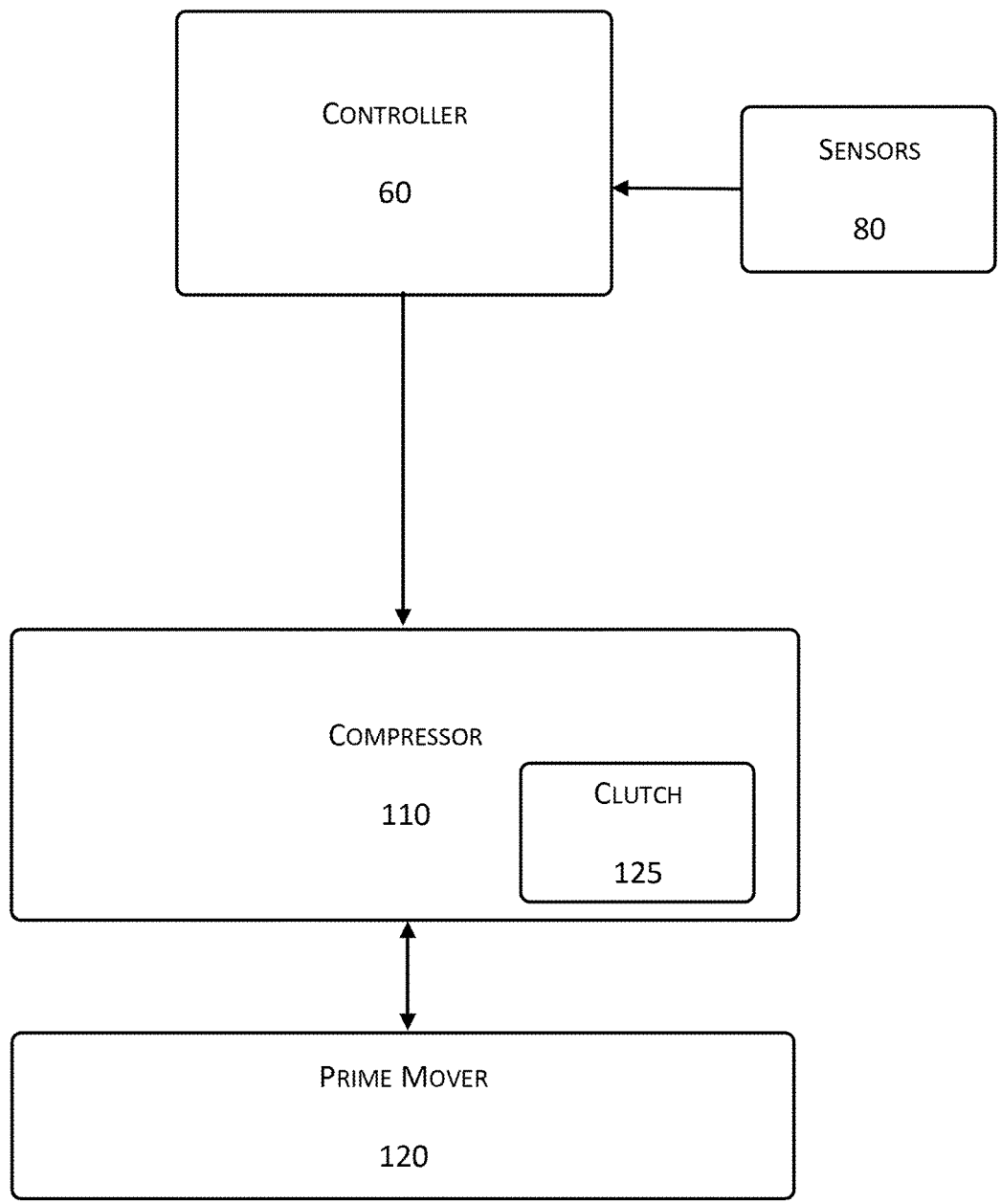
FIG. 3 shows a schematic block diagram of a system, in accordance with one or more non-limiting example embodiments of clutch burnishing.

FIG. 3 shows a schematic block diagram of a system 300, in accordance with one or more non-limiting example embodiments of clutch burnishing. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. As shown, system 300 may include TRS controller 60, one or more sensors 80, compressor 110, clutch 125, and prime mover 120, all of which are described above with regard to FIG. 2.

The embodiments and implementations pertaining to clutch burnishing, as described and recited herein, may be utilized to evenly and consistently, or otherwise satisfactorily, burnish clutch 125 that is newly installed, i.e., to prepare and condition clutch 125 so as to extend the functional life-span and torque carrying capability of clutch 125 beyond that of a clutch that is not burnished accordingly.

The embodiments and implementations pertaining to clutch burnishing, as described and recited herein, may be utilized when clutch 125 or any other clutch is newly installed, at any service interval, into the power management system.

Controller 60 may be provided as an integrated control unit or as a control unit formed by a distributed network of TRS elements.

Sensors 80 may be configured to detect one or more environmental conditions, e.g., temperature, humidity, air quality, etc., in a climate controlled space of a transport unit that is being provided climate control from the TRS and/or surrounding ambient environment outside the transport unit. Controller 60 may utilize data received from one or more of sensors 80 pertaining to respective detected environmental conditions to control facets of clutch burnishing.

Compressor 110, included in TRU 50, may pertain to a working fluid circuit or other air quality control system, to, e.g., compress a working fluid that may traverse a working fluid circuit to exchange heat with air, i.e., condition air, which may be injected into the climate controlled space of the transport unit to climate condition the climate controlled space.

Clutch 125, as the mechanical connection between prime mover 120 and compressor 110, may be configured to engage and disengage the mechanical connection of prime mover 120. Accordingly, compressor motor 112 (FIG. 2), prime mover 120, and compressor 110 may be provided in a single power train. Clutch 125 may disengage prime mover 120 when compressor motor 112 provides mechanical power to compressor 110 instead of prime mover 120.

Prime mover 120 may be, e.g., a diesel engine, a compressed natural gas engine, etc., disposed in TRU 50.

In accordance with system 300, a program to activate and/or control clutch-burnishing may be activated on controller 60, either automatically or manually. The program may provide automation to cycle through a series of engagements and disengagements for clutch 125 to ensure that clutch 125 is burnished to a recommended specification. The program may cycle the clutch, as a non-limiting example range based on testing, validation, and or type of clutch 125, 20-100 times in a safe and efficient manner to maintain an even and consistent burnish. The cycle, clearly, is repeatable and safe for repetition without damaging clutch 125 or other climate control components.

Burnishing of clutch 125 may be calibrated to account for machined armatures and rotors having peaks and valleys on respective mating surfaces that reduce the contact area therebetween. Reduced contact area on a mating surface plate may reduce static torque up to 50%. Thus, burnishing mating surfaces of clutch 125 by the aforementioned cycles at low inertia and/or speed may be utilized in order for the full torque carrying capabilities of clutch 125 to be realized.

It should be noted that clutch burnishing, as described and recited herein, may be implemented or applied to any clutch that may be provided within the power management system, e.g., system 300.

Figure 4:
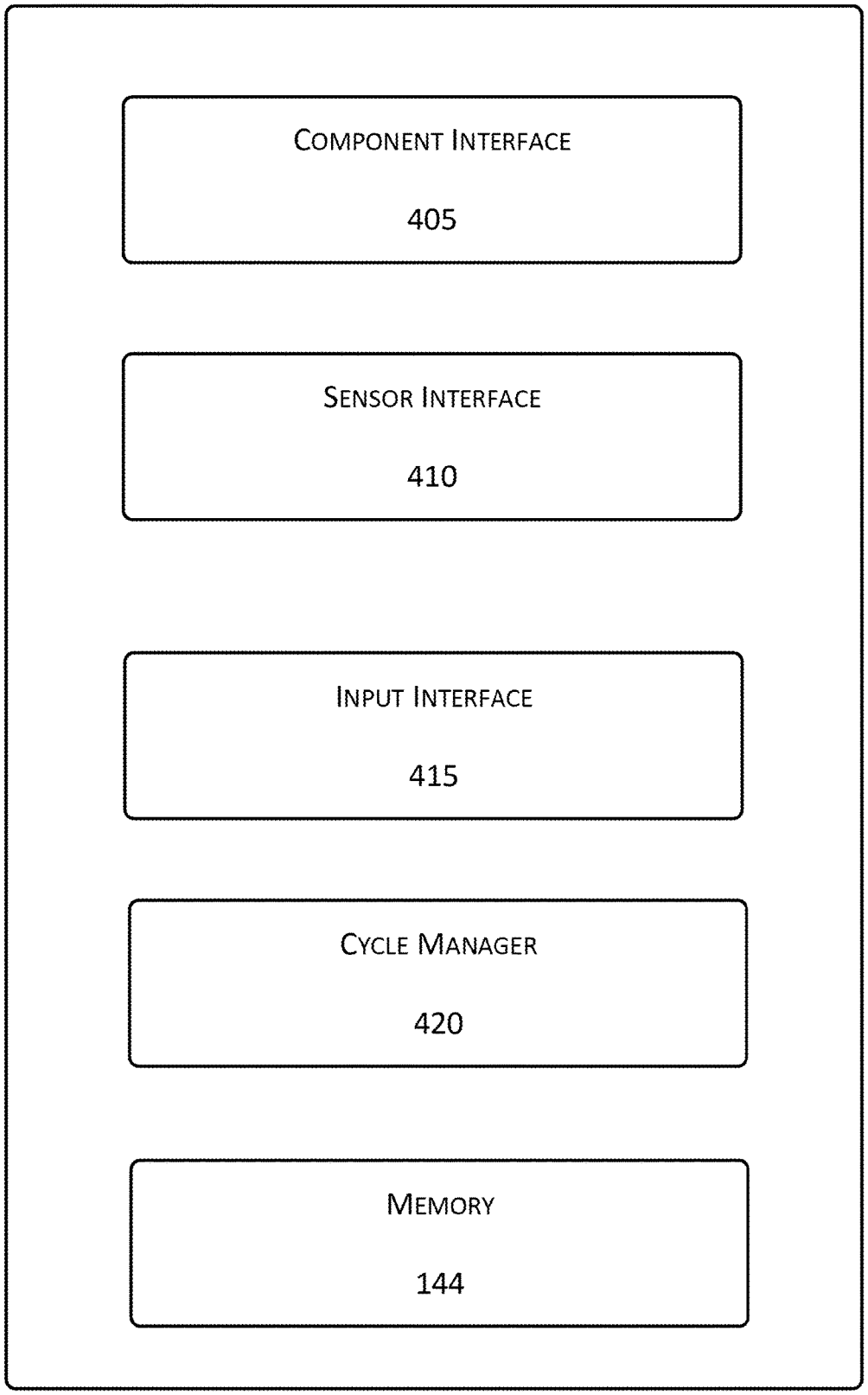
FIG. 4 shows a schematic block diagram of a controller, in accordance with one or more non-limiting example embodiments of clutch burnishing.

FIG. 4 shows a schematic block diagram of the controller 60, in accordance with one or more non-limiting example embodiments of clutch burnishing one or more clutches, e.g., clutch 125. As depicted in FIG. 4, controller 60 includes component interface 405, sensor interface 410, input interface 415, cycle manager 420, and memory 144. Although illustrated as discrete components, various components may be divided into additional components, combined into fewer components, or eliminated altogether while being contemplated within the scope of clutch burnishing as described and recited herein. It will be understood by those skilled in the art that each function and/or operation of the components of controller 60 may be implemented, individually and/or collectively, by a wide range of hardware, software, firmware, or any combination thereof.

Component interface 405 may be designed, programmed, or otherwise configured to implement data communication between controller 60 and other components associated with TRS 10, e.g., fans, blowers, valves, etc.

As a non-limiting example, component interface 405 may be designed, programmed, or otherwise configured to transmit instructions for one or more of a condenser fan or evaporator blower corresponding to compressor 110 to operate at a predetermined operating level, e.g., "high speed," upon initiating clutch burnishing, as described and recited herein.

Cycling clutch 125 on and off may cause the working fluid, e.g., refrigerant to pressurize and equalize on the high and low sides of the HVAC unit. The condenser fan may be utilized to remove pressure build up on the high-pressure zone of the HVAC system by condensing high pressure working fluid down to a high-pressure liquid by removing heat from the refrigerant lines. The removal of heat may also reduce overall pressure in the HVAC system. Typically, a condenser may not need much airflow across condenser coils because the bus does not need much cooling capacity to maintain set point within the cabin. However, under extreme temperatures or other exceptional circumstances that may cause the HVAC system to work hard, temperature and/or pressure on a high-pressure zone will likely require more airflow across condenser coils in order to remove as much heat as possible before any of the high-pressure cut-out switches are triggered to prevent damage to the refrigerant lines. In accordance with embodiments described and recited herein, because environmental conditions for clutch burnishing are not static, in order to protect the entire HVAC system, airflow across the condenser coils may be maximized by keeping relevant fans operating at a high setting.

Cycling 125 clutch repeatedly is not typical operation, and therefore the embodiments for cycling described and recited herein may include running condenser fans at a high setting to reduce a risk of high-side pressure, i.e., head pressure in fluid lines. In the embodiments described and recited herein, a high setting may pertain to a highest speed value at which motor 112 may safely blow air across the coils. As a non-limiting example, on a rear-mounted bus unit, a condenser coil may include two fans, each of which may have a maximum design for 2370 RPM, allowing for an estimated flow rate of 5200 cfm total for both fans.

In accordance with at least some embodiments, the adjustable operating levels may be subjective, e.g., "increase airflow," "decrease airflow," etc. Regardless, if an engagement cycle for one or more clutches, e.g., clutch 125, adversely affects pressure within system 300, the one or more condenser fan or evaporator blower operating at the predetermined level may reduce pressure and/or reduce a temperature within system 300.

As another non-limiting example, component interface 405 may be designed, programmed, or otherwise configured to receive data from one or more other components associated with TRS 10, including, but not limited to, performance data related but not limited to temperature, return air flow, discharge air flow, external ambient air, coolant inlet, compressor discharge, suction pressure, discharge pressure, etc. The other components may include fans, blowers, valves, and even the one or more clutches, e.g., clutch 125. The performance data may indicate whether the respective components are operating normally or at an acceptable performance level.

In accordance with at least one non-limiting example embodiment, component interface 405 may be further designed, programmed, or otherwise configured to receive data from one of sensors 80 or a separate calibration device, e.g., lock pulley (not shown), that measures a torque carrying capability in, e.g., foot-pounds ("ft-lbs"), of the one or more clutches. By such non-limiting example embodiment, a pulley corresponding to a compressor may be spun continuously via a motor-driven belt. When the clutch is engaged, an armature and pulley close together and form a friction surface to run the compressor. When the pulley is locked or otherwise halted, the clutch may be engaged and the armature plate may be spun with a torque wrench. As the armature and pulley slip, peak static breakaway torque of the clutch may be determined.

Non-limiting examples of data received at or by component interface 405 that may trigger an alarm and/or automatically cause clutch burnishing to at least pause until component performance is corrected may include one or more criterion such as: clutch output overload, e.g., clutch output is shorted; current from clutch output exceeds 4 A for 3 seconds; current from clutch output exceeds 6 A without or without delay; current from clutch output is less than 0.3 A over a threshold number of cycles; un-calibrated clutch output; high-pressure cutout shutdown on the compressor; low-pressure cutout shutdown on the compressor; and/or compressor discharge temperature exceeds 150° C. for one (1) minute.

With regard to an alarm related to pressure or temperature corresponding to the compressor, it is noted that when the clutch is engaged, the entire A/C system is running. Thus, by cycling the clutch, refrigerant cycles through the system. As the compressor operates, it takes time for pressures to equalize in the lines and produce evenly conditioned air. But when the clutch is cycled rapidly, lines may not yet be equalized, thus triggering a high pressure or low pressure alarm for the unit. Accordingly, burnishing the clutch may negatively impact other features or components related to the vehicle. Therefore, if an issue arises, even if not directly corresponding to the clutch, the burnishing procedure may immediately stop to alleviate damage.

For example, for a bus has a set-point of 72° F., during clutch cycling, the HVAC cools the bus to maintain the set-point temperature. TRS sensors 80 may monitor operation and temperature for the evaporator, condenser, fans, motors, actuators, etc., to cool the bus, thus avoiding overheating or over pressurizing any components therein.

Depending on the type of alarm, clutch cycling may continue with an alarm flashing or cycling may shut down to protect components. If the discharge pressure exceeds the value defined for a high-pressure cut-out switch, e.g., 350 PSI, a cutout switch may disengage the clutch, trigger an alarm or alert for a technician.

Sensor interface 410 may be designed, programmed, or otherwise configured to receive data from one or more of sensors 80 regarding environmental conditions within the climate controlled space of the transport unit that is being provided climate control by the TRS 10 and/or ambient environmental conditions surrounding the transport unit, including, but not limited to, temperature, humidity, air quality, etc. Upon receipt by sensor interface 410, such data may be stored in memory 144 and/or otherwise be utilized by cycle manager 420.

Non-limiting examples of data received at or by sensor interface 405 that may trigger an alarm and/or automatically cause clutch burnishing to at least pause until component performance is corrected may include excessive discharge temperature from the compressor, with excessive being a subjective parameter established and varying by application.

Input interface 415 may be designed, programmed, or otherwise configured to receive manual and/or automated input for clutch burnishing.

As a non-limiting example, input interface 415 may be designed, programmed, or otherwise configured to receive input instructions from a user interface (not shown) associated with TRS 10, including but not limited to controller 60. Such instructions may include manual or automated instructions to start, pause, or stop clutch burnishing. Manual instructions may be input, e.g., upon installation of one or more clutches being newly installed within the power management system at any service interval, e.g., clutch 125 being installed onto compressor 110. Automated instructions may be input, e.g., upon detection of one or more clutches being newly installed, or receiving notification thereof from component interface 405, on compressor 110.

As referenced previously, the prime mover 120 may drive a clutch pulley that, when engaged, drives an armature of the clutch. The armature may be connected to, and therefore, drive a shaft of the compressor, which then circulates refrigeration through an entire CCU. Therefore, when the compressor operates, refrigerant gases may be compressed from low pressure to high pressure; and thus suction and discharge ports thereof balance since there are no driving components to facilitate air flow.

Cycle manager 420 may be designed, programmed, or otherwise configured to receive static engagement/disengagement cycling parameters for burnishing the one or more clutches.

Non-limiting examples of such static parameters may be agnostic to the clutch model, e.g., a predetermined number of engagement and disengagement cycles, e.g., 20-200 cycles; tailored specifically to the clutch model, e.g., again, 20-200 cycles; etc.; five (5) seconds or more for each engagement so as to synchronize the clutch and 20 seconds or more for each disengagement to ensure that the clutch is completely off and that all other components are equalized.

Cycle manager 420 may additionally or alternatively be designed, programmed, or otherwise configured to dynamically establish engagement/disengagement cycling parameters for burnishing the one or more clutches. That is, cycle manager 420 may utilize data received by component interface 405 and/or sensor interface 410, either directly or via memory 144, to establish engagement/disengagement cycling parameters for burnishing newly installed one or more clutches.

As a non-limiting example, cycle manager 420 may take into account, in various combinations, a model of each of the one or more clutches, which pertains to weight, circumference, friction surface material, etc.; initial torque carrying capabilities; desired torque carrying capabilities, e.g., 260 ft-lbs; environmental conditions, as received by sensor interface 410; etc.

As another non-limiting example, when the performance data received by component interface 405 indicates that a respective component is not operating at an acceptable performance level, cycle manager 420 may determine whether to pause or even terminate clutch burnishing or whether to establish revised cycling parameters. Then, when the performance data received by component interface 405 indicates that the respective component is once again operating at an acceptable performance level, cycle manager 420 may determine whether to resume or re-state clutch burnishing.

Cycling manager 420, therefore, may be designed, programmed, or otherwise configured to begin, pause, and terminate clutch burnishing, based on manual input or on an automated basis.

Figure 5:
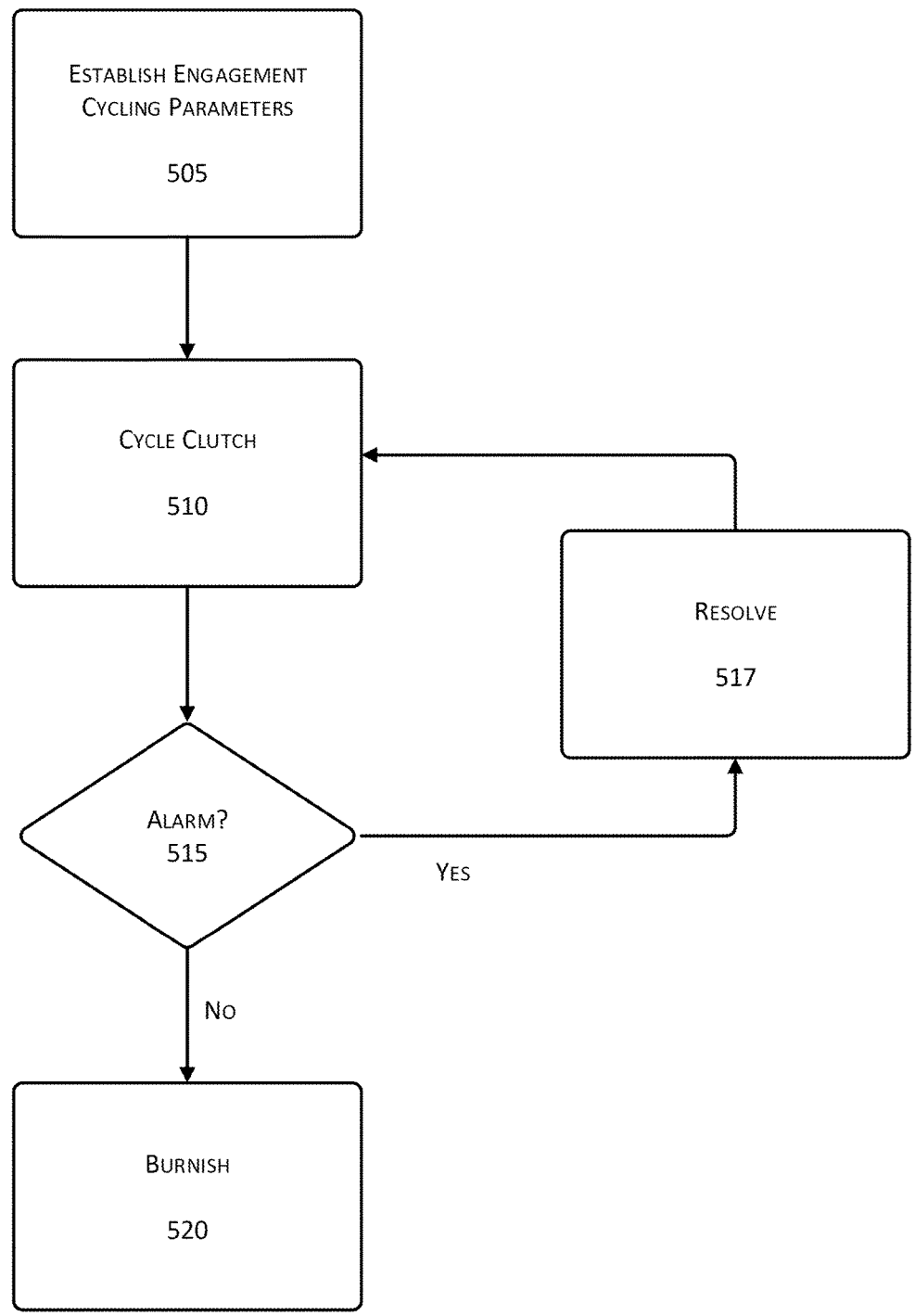
FIG. 5 shows a processing flow in accordance with one or more non-limiting example embodiments of clutch burnishing.

FIG. 5 shows a processing flow 500 in accordance with one or more non-limiting example embodiments of clutch burnishing. As depicted, processing flow 500 includes operations performed by various components of controller 60 that may be included in system 300. However, processing flow 500 is not limited to such components and processes, as obvious modifications may be made by re-ordering two or more of the operations described and/or recited herein, eliminating at least one of the operations, adding further operations, substituting components, or even having various components assuming operational roles accorded to other components in the following description. Processing flow 500 may include various operations, functions, or actions as illustrated by one or more of blocks 505, 510, 515, 517, and 520. These various operations, functions, or actions may, for example, correspond to software, program code, or program instructions executable by a digital processor that causes the functions to be performed. Processing flow may begin at block 505. While the process flow 500 discussed below is discussed with respect to clutch 125, it will be appreciated that the process flow 500 can be used to burnish additional or other clutches that may be used in the power management system of a TRS.

At block 505 (establish engagement cycling parameters), cycle manager 420 dynamically establishes engagement/disengagement cycling parameters for burnishing clutch 125. That is, in accordance with at least one non-limiting example, cycle manager 420 may utilize data received by component interface 405 and/or sensor interface 410, either directly or via memory 144, to establish engagement/disengagement cycling parameters for burnishing newly installed clutch 125. Taking into account factors, in various combinations, including a model of clutch 125, which pertains to weight, circumference, friction surface material, etc.; initial torque carrying capabilities; desired torque carrying capabilities, e.g., 260 ft-lbs; environmental conditions, as received by sensor interface 410; etc., cycle manager 420 may determine a number of engagement/disengagement cycling parameters to perform for newly installed clutch 125.

For at least one example, cycle manager 420 may also determine the length of time for each engagement of clutch 125, as well as for each disengagement. Further, as established by cycle manager 420, not each engagement is for a uniform length of time. Likewise, as established by cycle manger 420, not each disengagement is for a uniform length of time.

Variations in time parameters for, respectively, engagement and disengagement, may be influenced by one or more environmental conditions as received by sensor interface 410 and/or operating conditions of one or more other components as received by component interface 405.

As non-limiting examples, at block 505, cycle manager 420 may determine that clutch 125 is to cycle through a predetermined number between, for example, 20 to 200 engagements/disengagements and, further, that each engagement is to last about five (5) seconds and that each disengagement is to last for about 25 seconds to ensure that clutch 125 has turned off fully and that all other components are stabilized. In this regard, for at least one non-limiting example, re-engagement may depend on component interface 405 receiving data indicating that all other components have been equalized, e.g., data transmitted from a motion sensor 80 to component interface 405 may indicate that other relevant components have been equalized, thus establishing a significant condition for re-engagement by clutch 125.

Even further, cycle manager 420 may establish a parameter by which burnishing for clutch 125 is paused or even terminated if the performance data received by component interface 405 indicates that a respective component is not operating at an acceptable performance level; and then to resume or re-start burnishing or even re-start a burnishing process when the performance data received by component interface 405 indicates that the respective component is once again operating at an acceptable performance level.

In accordance with at least some example embodiments of clutch burnishing, the cycling parameters may be pre-established, and programmed to, e.g., memory 144.

At block 510 (Cycle Clutch), may refer to cycle manager 420 causing, in an automated manner, clutch 125 to alternately engage and disengage in compliance with the parameters established either dynamically by cycle manager 420 or pre-established and programmed to, e.g., memory 144 at block 505.

At determination block 515 (Alarm?), cycle manager 420 may detect an alarm triggered by data received by either of component interface 405 or sensor interface 410 at some point during the cycling of clutch 125 at block 510. More particularly, at determination block 515, cycle manager 420 may pause or terminate process 500 if, at any point during the process 500, component interface 405 receives data that may trigger an alarm and/or may automatically cause process 500 to at least pause until component performance is corrected. As listed above, such data may pertain to low or excessive current from clutch output, un-calibrated clutch output; excessively high or low pressure on the compressor.

Additionally or alternatively, at determination block 515, cycle manager 420 may pause or terminate process 500 if, at any point during the process 500, sensor interface 410 receives data that may trigger an alarm and/or may automatically cause process 500 to at least pause until environmental conditions rectify. Typically, but not exclusively, such environmental conditions may be pertain to excessive temperatures in or surrounding the compressor, e.g., ambient temperature of the vehicle.

Upon detection of an alarm at block 515, the process 500 proceeds to 517.

As long as cycle manager 420 does not detect an alarm triggered by data received by either of component interface 405 or sensor interface 410, process 500 may continue burnish the clutch 125 at block 520.

If cycle manager 420 does detect an alarm triggered by data received by either of component interface 405 or sensor interface 410, processing 500 may pause or otherwise stop until resolution at block 517.

At block 517 (Resolve), process 500 is paused or otherwise stopped until the faulty performance of one or more components as indicated by component interface 405 is resolved, either manually or automatically; and, additionally or alternatively, process 500 is paused or otherwise stopped until the unfavorable environmental conditions as indicated by sensor interface 410 are resolved, either manually or automatically Upon resolution of the faulty component performance or resolution of the unfavorable environmental conditions, process 500 may return to block 510 (cycle clutch), at which clutch burnishing may be resume or re-initiated.

At block 520 (Burnish), clutch burnishing as performed at block 510 has completed, i.e., fulfillment of clutch cycling parameters. Upon completion, burnishing processing may end and/or a notification may be provided visually on input interface 415 and/or audibly via an alarm system to thereby alert a user of completion.

Different features, variations and multiple different embodiments have been shown and described with various details. What has been described in this application at times in terms of specific embodiments is done for illustrative purposes only and without the intent to limit or suggest that what has been described is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "able to operably coupled", to each other to achieve the desired functionality.

As described and recited herein, known communication signals from charging equipment may be exploited to serve as a basis for reducing unit current demand. That is, the control signal from a power source or supply equipment informs unit power draw decisions.

Aspects

It is to be appreciated that any of the following aspects may be combined:

Aspect 1. A method for enhancing performance of a clutch that is newly installed in connection with an automotive HVAC system, comprising:
  establishing engagement cycling parameters for the clutch;
  cycling the clutch through a repetition of engagement and disengagement in accordance with the established engagement cycling parameters; and
  terminating the cycling upon achievement of at least one predetermined criterion.

Aspect 2. The method of Aspect 1, wherein the established engagement cycling parameters for the clutch include any one of a predetermined number of engagement cycles for the clutch, a predetermined amount of time for a totality of the cycling, or a predetermined threshold value of torque carrying capabilities for the clutch.

Aspect 3. The method of either Aspect 1 or Aspect 2, wherein the established engagement cycling parameters for the clutch include at least one predetermined range of temperatures for performing at least a portion of the cycling.

Aspect 4. The method of any of Aspects 1 to 3, wherein the established engagement cycling parameters for the clutch include between 20 to 100 engagement cycles.

Aspect 5. The method of any of Aspects 1 to 4, wherein the established engagement cycling parameters for the clutch include engagement for five seconds.

Aspect 6. The method of any of Aspects 1 to 5, wherein the established engagement cycling parameters for the clutch include disengagement for 25 seconds.

Aspect 7. The method of any of Aspects 1 to 6, further comprising, prior to the cycling, turning evaporator blowers and condenser fans at a predetermined operating level.

Aspect 8. The method of any of Aspects 1 to 7, wherein the at least one predetermined criterion includes a determination that the clutch is capable of carrying 260 ft-lbs of torque.

Aspect 9. The method of any of Aspects 1 to 8, wherein the clutch is an electromagnetic clutch newly installed onto an automatic HVAC compressor.

Aspect 10. A computer-readable medium having executable instructions that, when executed, cause one or more processors to pre-burnish an electromagnetic clutch, the instructions comprising:
  detecting input of at least one predetermined condition;
  initiating cycling of the clutch based on the detection;
  cycling the clutch through a repetition of engagement and disengagement in accordance with predetermined cycling parameters; and
  terminating the cycling upon fulfilling at least one of the cycling parameters.

Aspect 11. The computer-readable medium of Aspect 10, wherein the predetermined condition includes a start-up instruction from a user interface.

Aspect 12. The computer-readable medium of either Aspect 10 or Aspect 11, wherein the predetermined condition includes installation of a clutch that has a torque carrying capability that is less than 200 ft-lbs.

Aspect 13. The computer-readable medium of any of Aspects 10 to 12, wherein the predetermined cycling parameters for the clutch include at least one predetermined range of temperatures for performing at least a portion of the cycling.

Aspect 14. The computer-readable medium of any of Aspects 10 to 13, wherein the predetermined cycling parameters for the clutch include between 20 to 100 engagement cycles.

Aspect 15. The computer-readable medium of any of Aspects 10 to 14, wherein the predetermined cycling parameters for the clutch include engagement for five seconds.

Aspect 16. The computer-readable medium of any of Aspects 10 to 15, wherein the predetermined cycling parameters for the clutch include disengagement for 25 seconds.

Aspect 17. An automotive HVAC system, comprising:
  a clutch;
  a compressor onto which the clutch is installed; and
  a controller to burnish the clutch, upon installation onto the compressor, in accordance with automated processing of the method of any of Aspects 1 to 9.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for enhancing performance of a clutch that engages with a prime mover to provide power to a transport climate control system that includes a compressor and a controller, the method comprising:
  burnishing the clutch prior to utilization thereof by the transport climate control system, the burnishing comprising:
    establishing engagement cycling parameters for the clutch;
    automatically cycling the clutch through a repetition of engagement and disengagement in accordance with the established engagement cycling parameters; and
    terminating the cycling upon achievement of at least one predetermined criterion.

2. The method of claim 1, wherein the established engagement cycling parameters for the clutch include any one of a predetermined number of engagement cycles for the clutch, a predetermined amount of time for a totality of the cycling, or a predetermined threshold value of torque carrying capabilities for the clutch.

3. The method of claim 1, wherein the established engagement cycling parameters for the clutch include at least one predetermined range of temperatures for performing at least a portion of the cycling.

4. The method of claim 1, wherein the established engagement cycling parameters for the clutch include between 20 to 100 engagement cycles.

5. The method of claim 1, wherein the established engagement cycling parameters for the clutch include engagement for five seconds.

6. The method of claim 1, wherein the established engagement cycling parameters for the clutch include disengagement for 25 seconds.

7. The method of claim 1, further comprising, prior to the cycling, turning evaporator blowers and condenser fans at a predetermined operating level.

8. The method of claim 1, wherein the at least one predetermined criterion includes a determination that the clutch is capable of carrying 260 ft-lbs of torque.

9. The method of claim 1, wherein the clutch is an electromagnetic clutch.

10. The method of claim 1, wherein the at least one predetermined criterion is determined by a sensor configured to detect one or more environmental conditions including temperature, humidity, or air quality of the transport climate control system.

11. The method of claim 1, wherein the at least one predetermined criterion negatively impacts features other than the clutch in the vehicle.

12. A computer-readable medium having executable instructions that, when executed, cause one or more processors to burnish an electromagnetic clutch that engages with a prime mover to provide power to a transport climate control system that includes a compressor and a controller, the instructions comprising:
  burnishing the electromagnetic clutch prior to utilization by the transport climate control system, the burnishing comprising:
    detecting input of at least one predetermined condition;
    initiating cycling of the clutch based on the detection;

automatically cycling the clutch through a repetition of engagement and disengagement in accordance with predetermined cycling parameters; and terminating the cycling upon fulfilling at least one of the cycling parameters.

13. The computer-readable medium of claim 12, wherein the predetermined condition includes a start-up instruction from a user interface.

14. The computer-readable medium of claim 12, wherein the predetermined condition includes installation of a clutch that has a torque carrying capability that is less than 200 ft-lbs.

15. The computer-readable medium of claim 12, wherein the predetermined cycling parameters for the clutch include at least one predetermined range of temperatures for performing at least a portion of the cycling.

16. The computer-readable medium of claim 12, wherein the predetermined cycling parameters for the clutch include between 20 to 100 engagement cycles.

17. The computer-readable medium of claim 12, wherein the predetermined cycling parameters for the clutch include engagement for five seconds.

18. The computer-readable medium of claim 12, wherein the predetermined cycling parameters for the clutch include disengagement for 25 seconds.

19. A transport climate control system comprising:

a clutch configured to provide engagement and disengagement between a prime mover and a mechanically-driven component of a transport climate control system that includes a compressor and a controller; and a controller configured to burnish the clutch prior to utilization by the transport climate control system by automated processing, upon installation to a power management system of the transport climate control system, the burnishing comprising:

establishing engagement cycling parameters for the clutch;

automatically cycling the clutch through a repetition of engagement and disengagement in accordance with the established engagement cycling parameters; and terminating the cycling upon achievement of at least one predetermined criterion.

* * * * *